Nov. 19, 1968    J. A. WATKINS    3,412,393
ELECTROMAGNETIC INDICATOR WHEEL STRUCTURE HAVING
VARIABLE POSITION STATOR
Filed Jan. 16, 1968    3 Sheets-Sheet 2

INVENTOR.
JOHN A. WATKINS
BY
Louis Orenbuch
ATTORNEY

INVENTOR.
JOHN A. WATKINS
BY
*Louis Orenbuch*
ATTORNEY

United States Patent Office 3,412,393
Patented Nov. 19, 1968

3,412,393
ELECTROMAGNETIC INDICATOR WHEEL STRUCTURE HAVING VARIABLE POSITION STATOR
John A. Watkins, Cheshire, Conn., assignor, by mesne assignments, to United-Carr Incorporated, Boston, Mass., a corporation of Delaware
Filed Jan. 16, 1968, Ser. No. 698,215
7 Claims. (Cl. 340—378)

ABSTRACT OF THE DISCLOSURE

An indicator employs a rotor having a permanent magnet fixed to a drum on which symbols are marked. The symbols are arranged in two sets whose symbols alternate and any symbol can, by rotation of the drum, be presented in a window. The drum's position is governed by a stator which, when electrically energized, establishes a discretely oriented magnetic field with which the permanent magnet becomes aligned. The stator is pivotally mounted and an actuator turns the stator relative to the rotor whenever the indicator is commanded to display a symbol. A detent is arranged to hold the stator in either one of two fixed positions, the fixed position being determined by the last occurring command signals. Each set of symbols, to be displayable, requires the stator to be in a different one of the two fixed positions.

---

This invention relates in general to indicators of the type employing an electromagnetic stator to determine the orientation of a rotor upon which symbols are marked. In that type of indicator, any symbol on the rotor can be brought into view in a window of the indicator by appropriately energizing the windings of the electromagnetic stator. More particularly, the invention pertains to an improvement which increases the number of symbols that can be displayed.

Discussion of the prior art

The electromagnetic indicators upon which this invention is an improvement are of the type employing a rotor having a permanent magnet fixed to a drum on whose periphery are marked symbols. A stationary electromagnetic structure, termed the stator, is arranged, upon being energized by an electrical signal, to establish a discretely oriented magnetic field. For each symbol on the drum there is a corresponding uniquely oriented magnetic field that can be established by the stator. The electrical signal applied to the stator determines which one of these fields is established. In response to the establishment by the stator of the discretely oriented magnetic field, the rotor turns to align its permanent magnet with the stator's magnetic field and in doing so causes the symbol bearing drum to rotate and assume a fixed station. The rotor and stator are housed in a structure having a window permitting only one of the drum symbols to be visible in its entirety. The symbols are located on the drum in a manner such that for each unique field aligned position of the permanent magnet, a different symbol is displayed in the window. Adjacent each aligned position of the permanent magnet, a bar of soft iron or other readily magnetizable material is disposed to pull the permanent magnet to an "offset" position when the electrical signal to the stator ends and the stator's magnetic field decays. The magnetizable element also serves as a detent to hold the rotor in its offset position after cessation of the stator's electrical signal. The magnetizable detent provides a "memory" for the indicator because it retains the rotor in the offset position until the indicator is again actuated by an electrical signal to the stator.

To permit the symbols on the drum to be of maximum size, the symbols are symmetrically disposed around the entire circumference of the drum. That is, the symbols are spaced at uniform intervals around the drum's periphery and where there are an even number of symbols, one symbol is diametrically opposite another symbol. That arrangement utilizes the peripheral surface area of the drum as fully as possible, but requires the stator to be capable of establishing magnetic fields that are oriented in 180° opposite directions. Because of that requirement, "prior art" indicators use magnetizable detents as taught by U.S. Patent 2,943,313 to Gordon et al. or use the winding arrangement disclosed in U.S. Patent 3,311,911 to Pursiano et al. to provide offset positions which prevent "hang up" of the rotor when 180° oppositely directed fields are established in succession by the stator.

The number of symbols that can be displayed by the conventional indicator is determined by the number of discretely oriented magnetic fields that the stator can establish. In general, a conventional indicator of small size cannot display more than ten or twelve symbols. Where it was attempted to accommodate a larger number of symbols, without enlarging the indicator, the conventional indicator failed because the separation between discretely oriented magnetic fields and offset positions became so small that the rotor did not always assume the proper offset position. An indicator is generally required to be nearly infallible in operation and even very slight erratic operation is sufficient to spoil it as a conventional product.

Objectives of the invention

The principal objective of the invention is to increase the number of symbols that can be displayed by an electromagnetic indicator without requiring a larger drum or materially increasing the complexity of the stator or rotor. A further objective of the invention is to provide an indicator in which "hang up" of the rotor is eliminated.

The drawings

The invention, both as to its construction and mode of operation, can be better understood from the exposition which follows when it is considered in conjunction with the accompanying drawings in which:

FIG. 1A is an enlarged view of the spring return mechanism,

Figure 2:
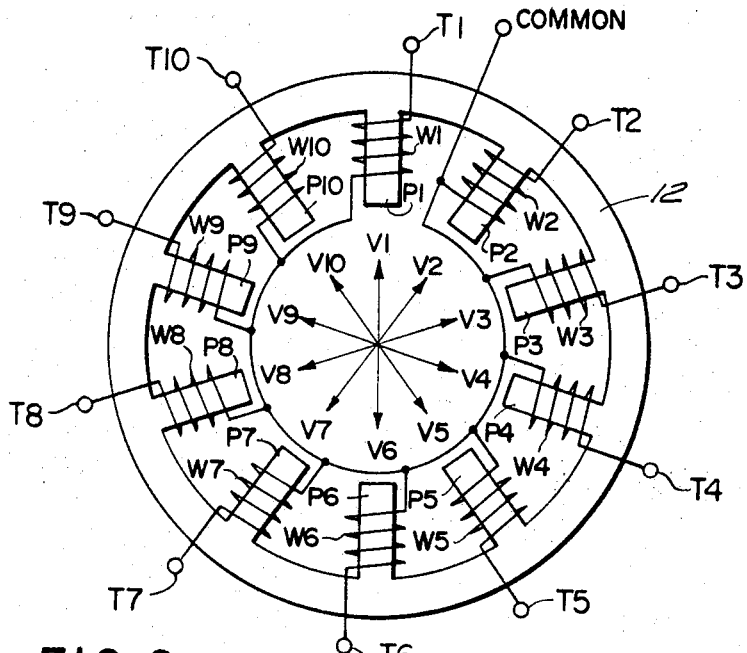
Figure 3:
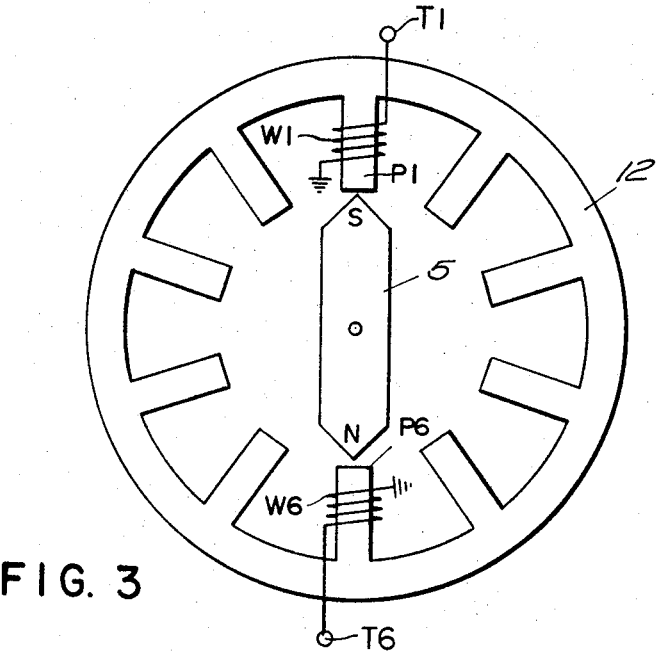
Figure 5:
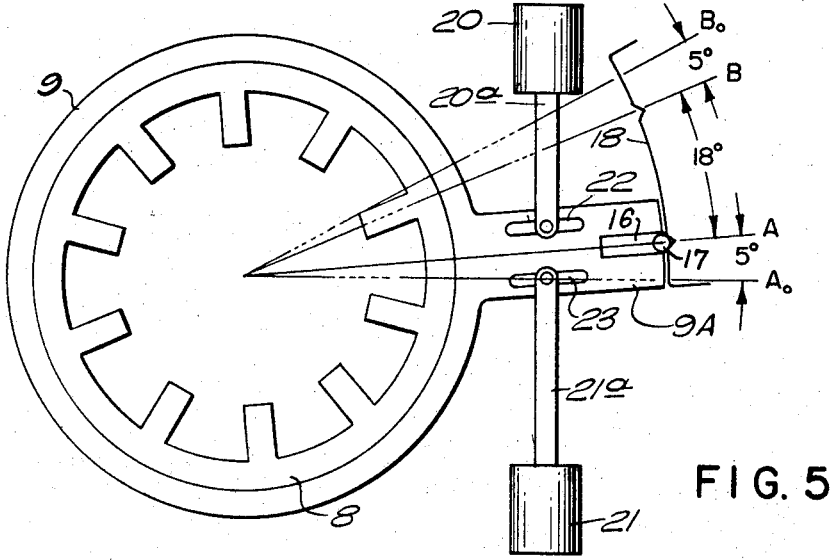
Figure 4:
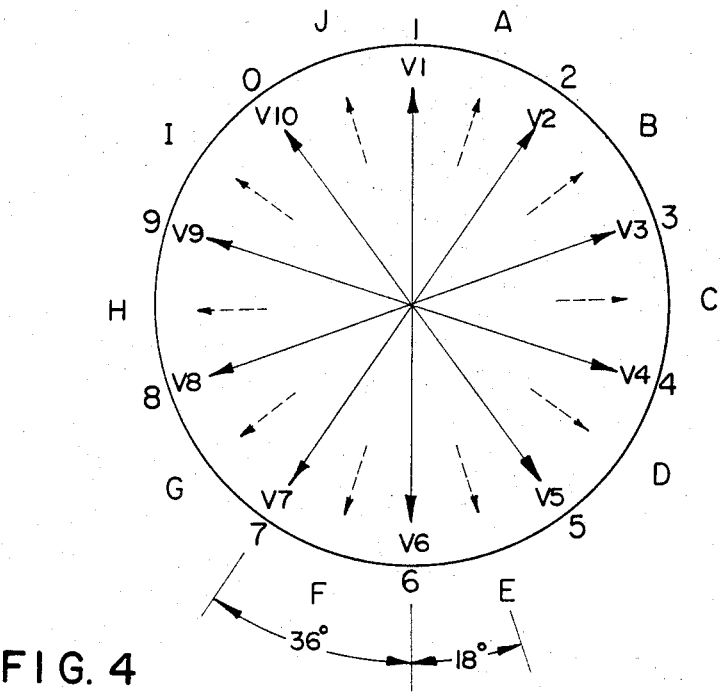

FIG. 2 is a schematic representation of the stator employed in the preferred embodiment, FIG. 3 illustrates the alignment of the rotor's permanent magnet with the field vector established by electrical energization of the stator, FIG. 4 schematically illustrates the symbols on the rotor and their relation to the vectorial directions of the magnetic fields that can be established by the stator, and FIG. 5 diagrammatically illustrates the operation of the rotatable stator.

The exposition

Figure 1:
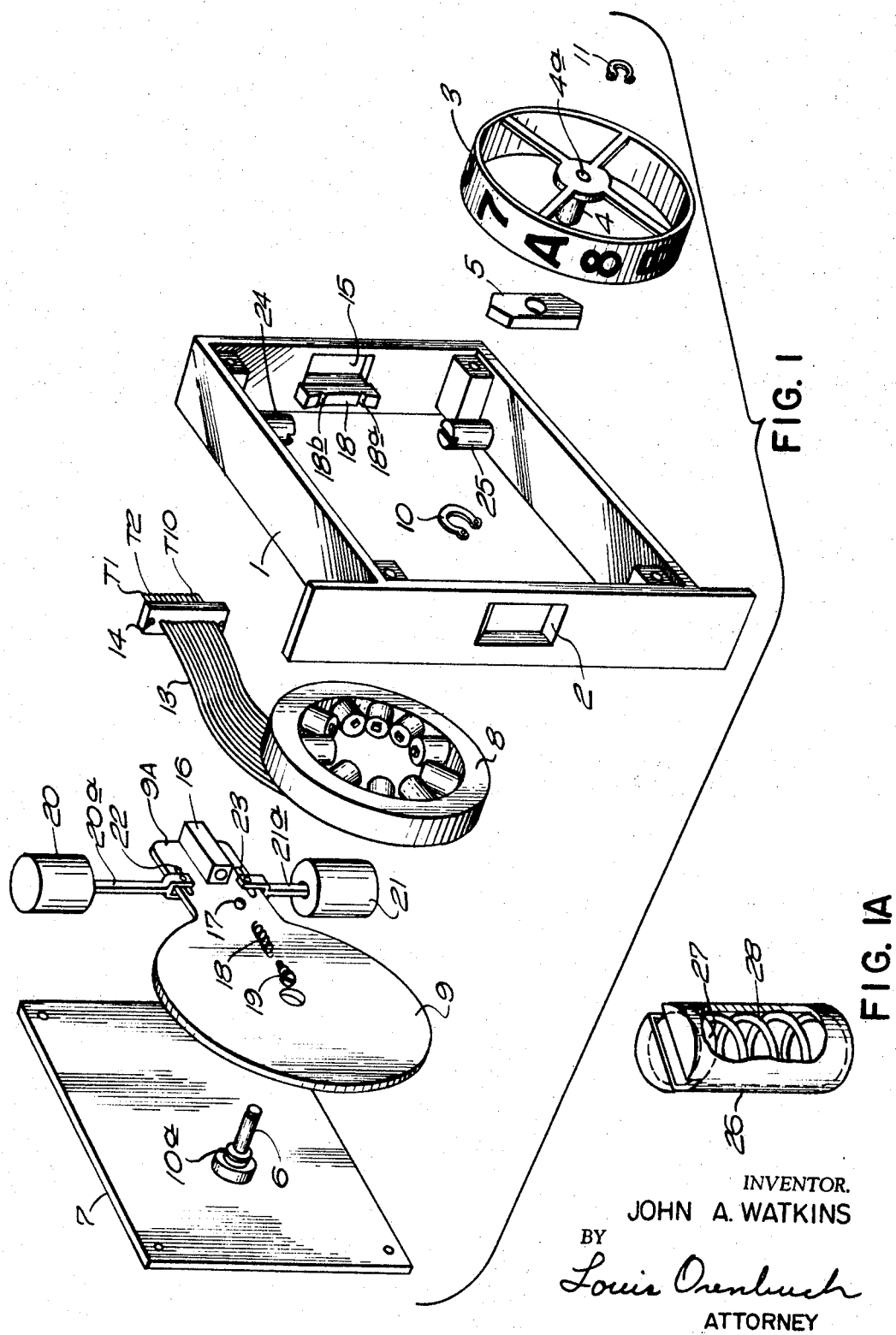
FIG. 1 is an exploded view of the preferred embodiment of the invention.

FIG. 1 depicts an electromagnetic indicator constructed in accordance with the invention. The indicator employs a housing 1 having a front panel containing a window 2 for displaying symbols carried upon the periphery of a drum 3. Each symbol is of a size which fills the window of the housing so that only one symbol can be completely within the window at any time. Drum 3, as depicted in FIG. 1, has a hub 4 to which a permanent magnet is secured. the permanent magnet has "salient" poles in the sense that the magnet's magnetic flux is concentrated at points which sharply define the North and South magnetic poles. The drum and permanent magnet comprise a rotor that is mounted to turn as a unit about a shaft 6. The shaft is secured to an end plate 7 and in the assembled indicator, the shaft extends through the center of an annular stator 8. The stator is carried upon an indexing plate 9 which is mounted to turn about shaft 6. The indexing plate is held upon the shaft by a retainer 10 that engages a groove 10a in the shaft. Hub 4 of the drum has a central bore 4a which permits the rotor to be mounted on the shaft. To retain the rotor so that it cannot slip off the shaft, a groove is provided near the shaft's end which is engaged by a C-shaped lock member 11.

The stator 8 is depicted in FIG. 2 and has an annular ferromagnetic core 12 from which ten poles P1, P2 ... P10 protrude radially inward. The poles are identical and are arranged symmetrically around the annulus. Each of the ten poles is surrounded by its own winding, symbolically indicated in FIG. 2 by the windings W1, W2 ... W10, and each winding can be separately energized by applying an electrical signal to it. Conventionally, each winding has one end connected to a COMMON line and the electrical signals applied to the windings are all of the same polarity with respect to the COMMON potential.

The stator 8 usually has its core 12 and windings embedded in a matrix of a synthetic resin (viz. a "plastic" substance). The synthetic resin holds the windings fixed upon the radial poles and aids in dissipating the heat that is generated by the current flow in the windings. To more clearly delineate the construction of the stator, it is, in the drawings, shown without its plastic embedment.

The stator is fastened to indexing plate 9 (FIG. 1) so that the stator and the plate turn as a unit upon the shaft 6. To provide external electrical connections to the windings, each of the windings is connected by flexible wiring 13 to terminals T1, T2 ... T10 and the COMMON terminal or a connector plug 14. Any of the stator's windings can be separately electrically energized by applying an electrical signal between the COMMON terminal and the appropriate one of the terminals T1, T2 ... T10. The housing 1 has an aperture 15 that accommodates plug 14 and permits access to its terminals.

Upon the rearwardly extending tab 9A of indexing plate 9 is carried a detent mechanism employing a tube 16 in which is housed a ball 17 biased by a spring 18 to partially protrude through an orifice at one end of the tube. The opposite end of the tube is closed by a threaded cap 19. The protruding ball 17, in the assembled indicator, bears against a track 18 in the housing 1. The track has two indentations which determine two indexed positions for plate 9. When the ball is engaged with one of those indentions in the track, the plate is held fixed in position and a substantial force is required to unseat the ball from its indented position. To supply that force when it is desired to move the indexing plate, solenoidal actuators 20 and 21 are provided. The solenoids are secured within the housing and the bifurcated ends of their armatures 20a and 21a carry pins which ride along slots 22 and 23 in plate 9. Upon energization of either of those solenoids by an electrical signal, the armature of the solenoid retracts and forces the indexing plate to pivot upon the shaft.

Within the housing 1 are damping devices 24 and 25 which are positioned in the path of the indexing plate 9. The damping devices are alike in construction and one of them is shown enlarged in FIG. 1A. The damping device has a cylindrical housing 26 in which are disposed a piston 27 and a spring 28. A slot in the housing is disposed to permit an edge of the indexing plate to bear upon the piston. The damping devices limit rotation of the indexing plate and cause the plate to move to an indexed position.

In the assembled indicator, end plate 7 is secured to posts at the interior corners of the housing. The corner posts may, for example, receive threaded screws or other fastening means which hold the end plate securely to the housing. The drum, in the assemblage, surrounds the stator 8 and the rotor's permanent magnet is within the annular core and in the same plane as the radial poles.

Flexible wiring 13 is of sufficient length to permit the stator and indexing plate 9 to turn to the extremities of motion permitted by the damping devices. To prevent external magnetic fields from interfering with the indicator's operation, the sides of housing 1 are closed by end plates which act as magnetic shields. If desired, plate 7 can be made to serve as one of such magnetic shields.

The stator shown in FIG. 2 can, upon electrically energizing an appropriate one of windings W1, W2 ... W10, establish any one of the ten discretely oriented magnetic fields whose directions are represented in the figure by vectors V1, V2 ... V10. Preferably the windings of the stator are similar so that the magnetic fields are of uniform magnitude where uniform electrical signals are impressed upon the terminals T1, T2 ... T10. By separately energizing the windings W1, W2 ... W10 of the stator, the rotor can be made to take any of ten vector aligned positions.

The symbols on the drum 3 of the rotor are arranged in two sets. For ease of exposition arabic numerals have been chosen to constitute one set and alphabet characters to constitute the other set. Each set has an even number of symbols and the symbols of one set alternate with the symbols of the other set completely around the drum's periphery. The arrangement of the symbols is schematically depicted in FIG. 4 where the positions of the alphanumeric characters are indicated in relation to the vectors which the stator must establish to display these symbols. The symbols are positioned on the drum to permit the numerical set to be brought into display position in the window when the stator is at station A and to permit the alphabetic set to be brought into display position when the stator is at station B.

Assuming, for example, that winding W1 is energized by an electrical signal impressed at terminal T1, the stator causes a magnetic field to be established whose direction is represented by vector V1. The permanent magnet 5, is constrained by the stator's magnetic field, to cause the rotor to turn to the position, depicted in FIG. 3, where the permanent magnet is aligned with field vector V1. Upon termination of the electrical signal to the W1 winding, the magnetic field established by the stator collapses. The rotor however retains its aligned position because of the attractive force between the poles of permanent magnet 5 and the adjacent P1 and P6 poles of the stator. The indicator, in essence, has a "memory" because the rotor remains in position after the command signal to the stator has ended and retains that position until the indicator is again actuated by another signal.

Where the positions of vectors V1, V2 ... V10 in FIG. 2 are as illustrated when the indexing plate 9 is held in the indexed station where ball 17 of the detent mechanism is seated in the 18a indentation, by moving the indexing plate to the station where the ball is seated in the 18b indentation, the vectors V1, V2 ... V10 are angularly displaced to the broken line positions indicated in FIG. 4. For ease of exposition, the indexed positions of the stator are denominated station A when indentation 18a is engaged and station B when indentation 18b is engaged.

The angular separation between adjacent field vectors of the indicator shown in FIG. 2 is 36°. To permit symbols of maximum uniform size to be marked on the drum, the angular separation between station A and station B is 18°. With that arrangement, the symbols of one set are disposed midway between adjacent symbols of the other set.

In FIG. 5, the stator 8 is shown with the indexing plate 9 detented at station A. To move the stator to station B, the indexing plate must be turned through an 18° angle. With the stator at station A, any arabic numeral on the drum can be displayed in the window by energizing the appropriate stator winding. If it is desired to display an alphabet character, solenoid 20 is energized to cause the stator to move to station B and the stator is energized to establish the desired field vector. To insure accurate operation of the indicator, the command signal to display an arabic numeral includes an electrical signal which energizes solenoid 21 and the command signal to display an alphabet character includes an electrical signal to energize solenoid 20.

Solenoids 20 and 21 are arranged, upon being electrically energized, to pull the indexing plate beyond the A and B stations. The solenoids are so arranged to prevent "hang-up" of the rotor where the indicator is commanded to display smybols in the same set that are 180° apart on the surface of the drum. That is, where 180° opposite magnetic fields are established in succession by the stator, unless special provisions are made, no turning moment is present to cause the permanent magnet to rotate into alignment with the last occurring magnetic field. Consider for example FIG. 3 of the drawings where permanent magnet 5 is shown aligned with poles P1 and P6 due to the previous electrical energization of winding W1. Assuming that the stator is fixed in position and that the next signal to the stator causes winding W6 to be electrically energized, the rotor must turn through 180° to align the magnet 5 with the V6 vector. There is, however, no turning moment present to cause the rotor to turn because the magnetic field established by the stator is precisely 180° opposite to the field of the permanent magnet. The resultant force acting on the permanent magnet is therefore directed through the rotor's axis of rotation. The rotor, consequently, tends to remain in position (viz., tends to "hang-up") and its initial turning motion, if it turns at all, is sluggish.

In the preferred embodiment, rotor "hang-up" is prevented by using the solenoids 20 and 21 to enlarge the angular rotation beyond the 18° arc indicated in FIG. 5. When moved by a solenoid from one station to the other, the stator, in effect, is caused to overshoot the detented position and the damping device 24 or 25 (FIG. 1) subsequently returns the stator to the appropriate detented position. In FIG. 5, solenoid 21 is arranged to pull the stator beyond station A to the $A_0$ position and solenoid 20 is arranged to pull the stator beyond station B to the $B_0$ position. For purposes of exposition, 5° has arbitrarily been chosen as the angular separation between a station and the adjacent $A_0$ or $B_0$ position. Thus, when solenoid 20 in FIG. 5 is energized, the stator is rotated through an angle of 23° to the $B_0$ position where the damping device 24 absorbs the impact of the moving stator and causes it to decelerate. In position $B_0$, the spring 28 (FIG. 1A) in damping device 24 (FIG. 1) is compressed by the indexing plate which bears upon piston 27. Upon deenergization of solenoid 20, the spring in the damping device causes the piston to move the stator to station B.

Where the stator is at station A, as depicted in FIG. 5, and solenoid 21 is energized, the stator is pulled to position $A_0$ where the indexing plate bears upon the piston in damping device 25 and causes its spring to be compressed. Upon deenergization of solenoid 21, the damping device restores the stator to station A.

Depending, therefore, upon which solenoid is energized, the stator swings through an angle of 5° or through an angle of 23°. As the energization of the stator's winding, in the preferred mode of operation, is always accompanied by an electrical signal to one of the other of the two solenoids, the stator always rotates to provide a turning moment which prevents "hang-up" of the rotor. Preferably the electrical signal applied to solenoid 20 or 21 is of shorter duration than the command signal applied to the stator's winding to permit the stator to be at station A or B when the rotor's magnet comes into alignment with the field vector. By employing such solenoid signals, the "blink" that is associated with the indicators of Gordon and Pursiano is avoided.

Although the invention has been described as employing a stator of the kind having radial poles, it is obvious that other types of stators may be used to establish the magnetic field vectors. For example, the toroidal type of stator described in the cited Gordon patent can be mounted on the indexing plate in lieu of the radial pole stator 8. As another example, the stator structures described in my U.S. Patent 3,289,199 can be substituted on the indexing plate.

The invention has been described herein as providing two detented positions for the indexing plate and its stator. Modifications of the invention to provide more than two detented positions will be obvious to those skilled in the art. Further, the detent mechanism need not be carried upon the indexing plate, but can be secured to the housing and the tab 9A of the indexing plate can be provided with indentations positioned to be engaged by the detent mechanism when the plate is at the desired stations. The damping device, in a more rudimentary form, can be merely a spring arranged upon the solenoid's armature so that the spring is compressed when the armature's travel exceeds a designated "throw."

Because the invention can be embodied in varied structures, it is not intended that the invention be limited to the forms here illustrated or described. Rather, it is intended that the invention be delimited by the appended claims and include those structures that do not fairly depart from the essence of the invention.

What is claimed is:
1. In an electromagnetic device of the type utilizing
    a stator having means selectively energizable by electrical signals to establish any one of a plurality of discretely oriented magnetic fields,
    a rotor having a magnet attached to a drum, the rotor being mounted to permit the magnet to rotate into alignment with the discretely oriented magnetic field established by the stator whereby a fixed position is determined for the drum,
the improvement for increasing the number of fixed positions for the drum that can be determined by the stator, the improvement comprising,
    means mounting the stator to turn relative to the rotor,
    means for holding the stator in fixed stations,
    and actuating means for causing the stator to move from one fixed station to another.
2. In an electromagnetic device of the type according to claim 1 wherein
    the stator, when in one station, is capable of successively establishing two magnetic fields that are oriented in 180° opposite directions
the improvement further including,
    means for applying electrical signals to the actuating means to cause the stator to rotate away from its fixed station whenever the stator is commanded to establish a magnetic field.
3. In an electromagnetic device of the type utilizing
    a housing having a window,
    a stator having means selectively energizable by electrical command signals to establish any one of a plurality of discretely oriented magnetic fields, at least two of the magnetic fields being 180° opposite in direction,
    a rotor having a magnet and a drum which turn as a unit, the rotor being mounted to permit the magnet to provide into alignment with the discretely oriented magnetic field established by the stator, the drum being disposed in the housing and having symbols fixed upon it in positions where the symbols are displayed in the window when the magnet is in its field aligned positions,
the improvement for increasing the number of symbols on the drum that can be displayed by the indicator, the improvement comprising
    means mounting the stator to turn relative to the housing,
    means for holding the stator in fixed stations, and
    actuating means for causing the stator to rotate off from its fixed position whenever the indicator is electrically commanded to display a symbol.

4. The improvement according to claim 3, further including
a shaft rigidly secured to the housing, and wherein the rotor is pivotally mounted on the shaft,
and the means mounting the stator to turn relative to the housing is an indexing plate mounted on the shaft to pivot independently of the rotor.

5. The improvement according to claim 4, wherein the means for holding the stator in fixed positions is a detent mechanism arranged to hold the indexing plate at the fixed stations in the absence of energizing signals to the actuating means.

6. The improvement acocrding to claim 5, wherein the actuating means, when energized, cause the stator to be rotated beyond the intended fixed station, and the improvement further includes
damping means arranged to return the stator to the intended fixed station when the actuating means becomes deenergized.

7. The improvement according to claim 6, wherein the actuating means are a pair of solenoids arranged to rotate the indexing plate in opposite directions.

No references cited.

JOHN W. CALDWELL, *Primary Examiner.*

H. I. PITTS, *Assistant Examiner.*